United States Patent [19]

Lankar

[11] Patent Number: 5,081,408

[45] Date of Patent: Jan. 14, 1992

[54] DIGITAL SERVO-CONTROL SYSTEM

[75] Inventor: André Lankar, Paris, France

[73] Assignee: Alcatel Cit, Paris, France

[21] Appl. No.: 597,223

[22] Filed: Oct. 15, 1990

[30] Foreign Application Priority Data

Oct. 17, 1989 [FR] France ................................ 8913550

[51] Int. Cl.[5] ............................................. H02P 7/28
[52] U.S. Cl. ...................................... 318/604; 318/601;
318/628; 318/569; 323/225; 363/42
[58] Field of Search ............... 318/569, 608, 604, 601,
318/628, 600, 809, 807, 603, 609, 636; 323/275;
363/42

[56] References Cited

U.S. PATENT DOCUMENTS

| | | | |
|---|---|---|---|
| 3,793,511 | 2/1974 | Bala et al. | 318/603 |
| 4,053,819 | 10/1977 | Matsumoto | 318/636 |
| 4,063,146 | 12/1977 | Oliver | 323/225 |
| 4,272,818 | 6/1981 | McDaniel | 318/608 |
| 4,763,057 | 8/1988 | Danz et al. | 318/809 |
| 4,825,132 | 4/1989 | Gritter | 363/42 |

Primary Examiner—William M. Shoop, Jr.
Assistant Examiner—John W. Cabecca
Attorney, Agent, or Firm—Sughrue, Mion, Zinn, Macpeak & Seas

[57] ABSTRACT

The present invention relates to a digital servo-control system whose purpose is to control very high precision equipment. The system includes two digital-to-analog converters, one of which is followed by a divider, with the two converters contributing to producing a control signal. A processor responds to a measurement signal and to a reference value to generate the digital values that are delivered to the converters. The system is particularly suitable for application to servo-controlling a voltage-controlled oscillator.

3 Claims, 3 Drawing Sheets

DIGITAL SERVO-CONTROL SYSTEM

The present invention relates to a digital servo-control system with the purpose of controlling very high precision equipment.

BACKGROUND OF THE INVENTION

Digital servo-control systems generate a control signal in the form of a number which is generally binary. If the equipment that is to be servo-controlled is designed for receiving an analog signal (usually a voltage), then it is necessary to provide a digital-to-analog converter which converts a binary number into a voltage proportional to said number. The resolution of such a system is determined by the resolution of the converter which is itself a function of its capacity measured as a number of bits.

The 12-bit converters that are commercially available are manufactured by numerous manufacturers and they are not expensive. 16-bit converters are also commercially available. The largest capacity converters that are available at present are 18-bit converters, and they are very expensive.

European patent number EP-A-0 043 536 describes a two-module converter in which each module may itself be considered as being a converter. The first module provides coarse adjustment while the second provides fine adjustment with the output analog signal being the sum of the output signals from the two modules. As a result, resolution is limited by the resolution of the second module. In addition, this circuit is designed to be integrated on a single component and it is poorly suited to being made up from standard converters. This solution is therefore expensive.

An object of the present invention is thus to provide a digital servo-control system capable of being embodied using standard components while providing increased resolution at low cost. It makes servo-control of equipment possible at a resolution which is better than that of currently available converters.

SUMMARY OF THE INVENTION

The system of the invention is designed to provide digital servo-control of equipment having an input for receivng a servo-control signal and also producing a measurement signal representative of the magnitude to be servo-controlled. The system comprises a processor receiving both said measurement signal and a reference value, and delivering both a correction value to a first digital to analog converter and an adjustment value to an adjustment assembly, a summing circuit producing said control signal on the basis of a correction signal delivered by said first converter and an adjustment signal delivered by said adjustment assembly, the system being characterized in that said adjustment assembly includes a second digital-to-analog converter which receives said adjustment value, followed by a voltage divider which produces said adjustment signal, said adjustment value providing a contribution to said control signal which is conditioned by the division factor of said voltage divider.

In addition, the digital servo-control system may include a timing module having an input that receives an intermediate signal delivered by said summing circuit and having an output on which said control signal is delivered, a comparator which receives said intermediate signal on one of its inputs and said control signal on another input and which delivers an output signal specifying the position of said control signal relative to said intermediate signal, said output signal being delivered to said processor, said processor including means suitable, when said correction value has been changed, for acting on said adjustment value in such a manner as to cause said intermediate signal and said control signal to tend to be equal.

An application that is particularly suitable for the digital servo-control system lies in servo-controlling a voltage controlled oscillator.

BRIEF DESCRIPTION OF THE DRAWINGS

Embodiments of the invention are described by way of example with reference to the accompanying drawings, in which.

DETAILED DESCRIPTION

When the same items appear in different figures, they are given the same references.

Figure 1:
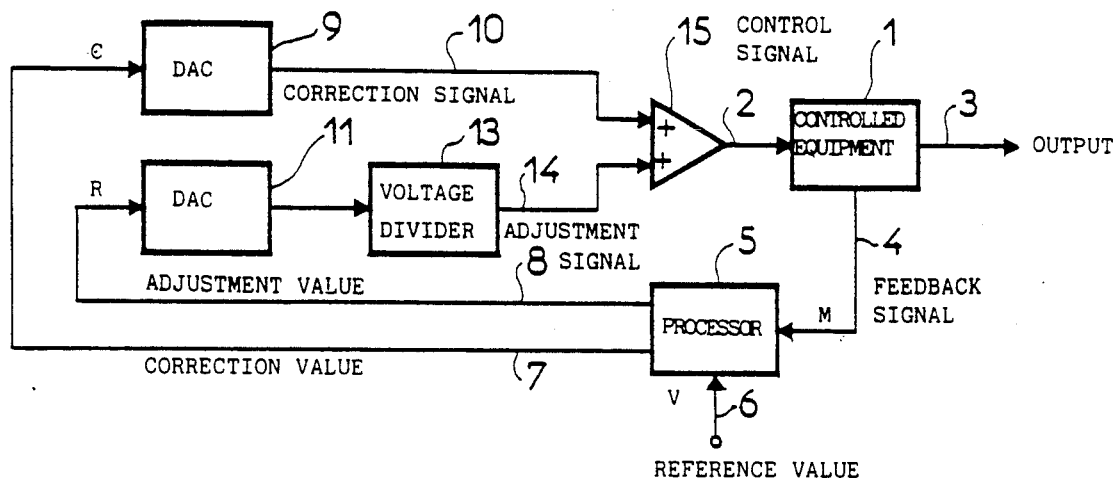
FIG. 1 is a block diagram of a digital servo-control system of the invention.

The digital servo-control system shown in FIG. 1 is shown in association with equipment 1 that is to be servo-controlled. The equipment 1 has an input for receiving a servo-control signal 2, and it produces an output magnitude 3 and a measurement signal 4 representative of said magnitude.

The system comprises a processor 5 which receives both the measurement signal 4 and a reference value 6, and which provides both a correction value 7 and an adjustment value 8, with these two values being binary numbers.

The digital servo-control system also comprises a first digital-to-analog converter 9 which converts the correction value 7 into a correction signal 10. It also includes a second digital-to-analog converter 11 which receives the adjustment value 8 and which is followed by a voltage divider 13 to produce an adjustment signal 14.

The servo-control signal 2 is produced by a summing circuit 15 which has inputs receiving the correction signal 10 and the adjustment signal 14.

In this case, the two converters 9 and 11 are assumed to be identical, i.e. each of them produces the same output voltage when presented with the same input digital value. The voltage divider 13 produces an output voltage which is equal to its input voltage divided by a factor k. The adjustment value 8 thus provides a contribution to the servo-control signal 2 which is k times smaller than the contribution of the correction value 7. Without going beyond the scope of the invention, it is possible to obtain a similar result by modifying the reference voltage of one of the converters, for example.

The servo-control mode adopted in this embodiment is of the incremental type, but this should not be considered as being a limitation on the invention. In servo-control of this type, the measurement signal 4 is compared with the reference value 6. The action undertaken by the servo-control system depends solely on the relative positions of these two numbers, with the measurement signal 4 being considered as constituting digital data. If the measurement signal 4 is less than the reference value, then the servo-control signal 2 is incremented by the smallest possible amount given the performance of the converters. If the measurement signal 4 is greater than the reference value 6, then the servo-control signal is decremented by the smallest possible amount. Finally, if the measurement signal and the reference value are identical, then the signals are not altered.

Figure 2:
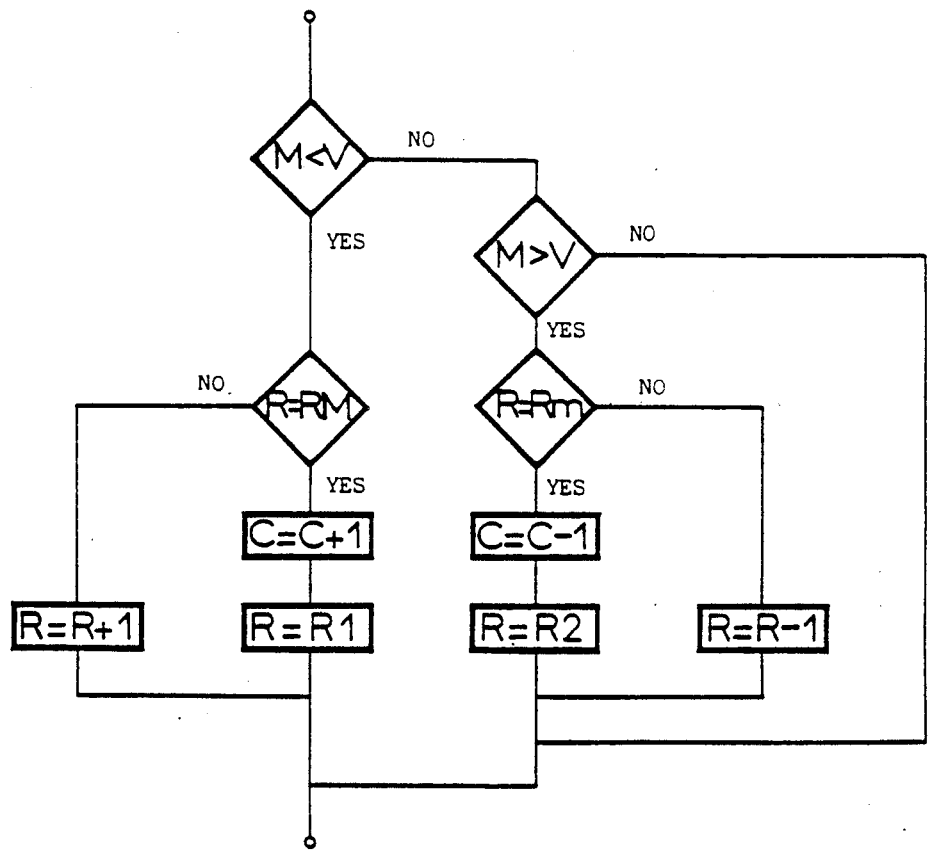
FIG. 2 is a flow chart describing the operation of said system.

The means for performing servo-control of this type are described in greater detail with reference to FIG. 2. In order to clarify this figure, certain conventions have been adopted in defining the various characteristic values. The second converter receives an adjustment value 8 on its input, which value is also referred to by the letter R. This converter is used over a range between a minimum value Rm and a maximum value RM, where Rm and RM are selected in such a manner that the difference between them is greater than the division factor k. Two other values R1 and R2 are also defined, for a purpose described below. The correction value 7 applied to the first converter is referenced C, and the reference value 6 is given the reference V while the measurement signal 4 is given the reference M.

Thus, the processor 5 includes means for comparing M (the measurement signal 4) with V (the reference value 6):

1. if M is less than V, then R (the adjustment value 8) is compared with RM;
  1.1 if R is equal to RM, then the second converter cannot be incremented in this case, so C (the correction value 7) is incremented, while the value of R is forced to R1;
  1.2 if R is not equal to RM, then R is incremented;
2. if M is greater than V, then R (the adjustment value 8) is compared with Rm;
  2.1 if R is equal to Rm, then R cannot be decremented, so C is decremented and R is forced to R2;
  2.2 if R is not equal to Rm, then R is decremented; and
3. if M is equal to V, then neither R nor C is altered.

In theory, if all the components were perfect, then R2 could be taken as being equal to RM and R1 as being equal to Rm. However, in order to compensate for small errors due to the converters 9 and 11, and to the voltage divider 13, R2 is selected to be a little smaller than RM and R1 is selected to be a little greater than Rm so that the difference between R2 and R1 is greater than k. This presents oscillations which could otherwise occur if the servo-control signal 2 were to reduce slightly after an operation intended to increase it, or on the contrary, if it were to increase slightly after an operation intended to reduce it.

Figure 3:
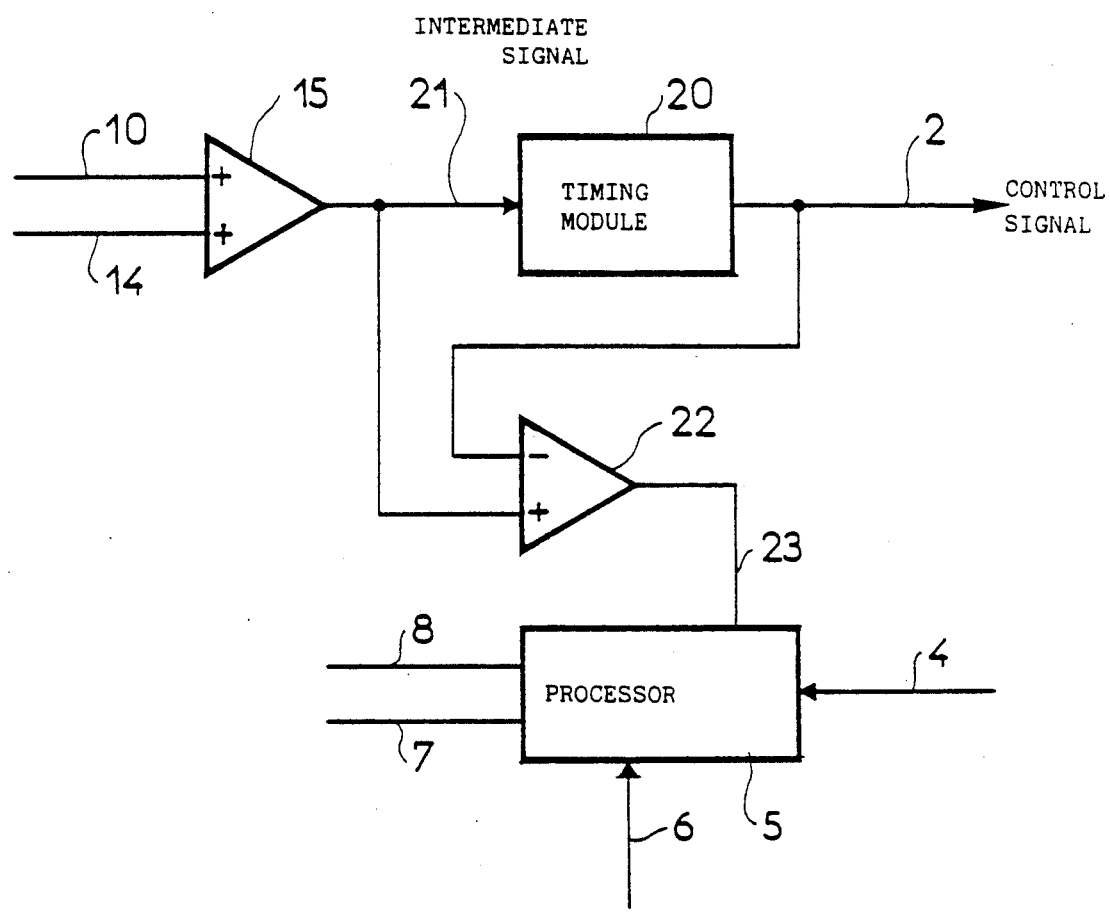
FIG. 3 is a diagram of a variant of the digital servo-control system of the invention.

In a variant of the servo-control system of the invention, the same considerations apply. However, the following modifications are added, as can be seen in FIG. 3. A timing module 20 is interposed between the summing circuit 15 and the servo-controlled equipment 1. The input of the timing module receives the output from the summing circuit 15, which signal is referred to below as the "intermediate" signal 21. The output from the timing module delivers the control signal 2. The timing module 20 may be a delay line suitable for forwarding a signal from its input to its output 2 after a time delay T. Advantageously, the timing module 20 is a sample-and-hold circuit which changes its output at a recurrence frequency corresponding to the period T. At the beginning of each period it relays to its output the signal that it sees on its input, while during the remainder of the period it takes no account of the signal on its input. The servo-control system also includes a comparator 22 having one input receiving the intermediate signal 21 and another input receiving the control signal 2. It produces an output state signal 23 which is delivered to the processor 5. The output state signal specifies whether the control signal 2 is greater than, or less than, or equal to the intermediate signal 21. With reference to conventional comparator operation that produces a binary output signal relating to the difference between the signals applied to its two inputs, providing the difference is greater than a threshold, the two signals applied to the comparator 22 are taken as being equal once a single increment in the adjustment value 8 would suffice to cause the comparator 22 to switch over. In addition, the comparator is selected so that its own threshold is less than the variation in the intermediate signal 21 which corresponds to a signal increment in the adjustment value 8.

This variant of the servo-control system makes it possible, once the second converter 11 has reached one or other of the extremes of its operating rang (R=RM or R=Rm), to compensate for errors due to the two converters 9 and 11 and to the voltage divider 13. When the correction value 7 is changed, then the system acts on the adjustment value 8 in such a manner as to establish an intermediate signal 21 whose value is equal to that of the control signal 2. The period T is selected so that the time required for this operation is less than T. The system may then proceed to change the adjustment value 8.

Figure 4:
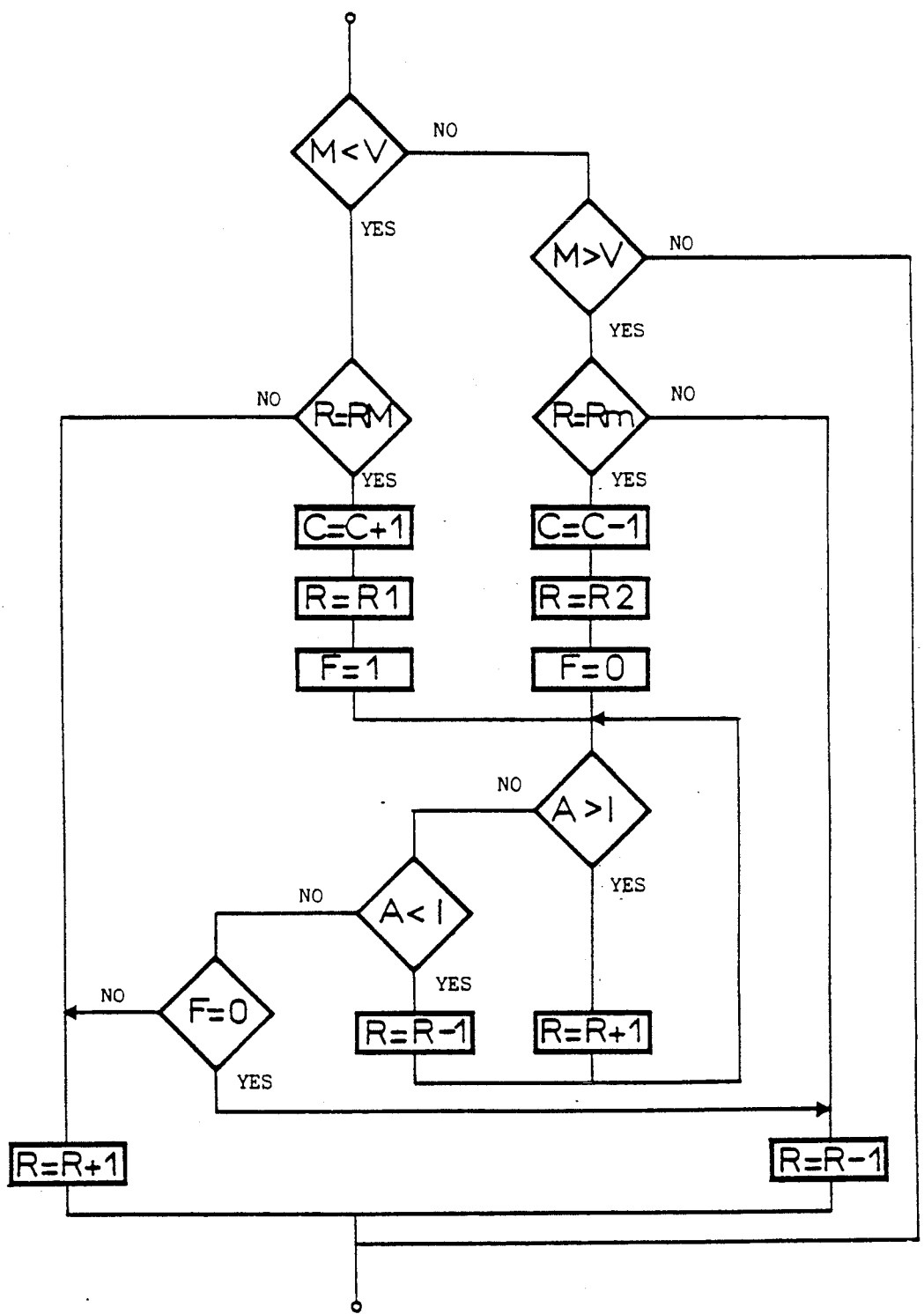
FIG. 4 is a flow chart describing the operation of said variant.

Means enabling servo-control to be performed in this way are described with reference to FIG. 4. In addition to the previously used references which remain valid, reference I is used for the intermediate signal 21, and A for the control signal 2. Use is also made of a register S which is set to zero if the control signal 2 is to be reduced and which is set to one if this signal is to be increased.

Thus, the processor 5 comprises means for comparing M (the measurement signal 4) with V (the reference value 6):

1. if M is less than V, then R (the adjustment value 8) is compared with RM;
  1.1 if R is equal to RM, then C (the correction value 7) is incremented, R (the adjustment value 8) is forced to R1, the register F is set to 1, and subsequently A (the control signal 2 is compared with I (the intermediate signal 21);
    1.1.1 if A is greater than I, then R is incremented, A and I are compared again, and depending on the result of this comparison, one of steps 1.1.1, 1.1.2, or 1.1.3 is performed;
    1.1.2 if A is less than I, then R is decremented, and A and I are compared again, and depending on the result of this comparison, one of the steps 1.1.1, 1.1.2, or 1.1.3 is performed;
    1.1.3 if A and I are equal, then the value of F is tested;
      1.1.3.1 if F=0, then R is decremented;
      1.1.3.2 if F=1, then R is incremented;
  1.2 if R is not equal to RM, then R is incremented;
2. if M is greater than V, then R (the adjustment value 8) is compared with RM;
  2.1 if R is equal to Rm, then C (the correction value 7) is decremented, R (the adjustment value 8) is forced to R2, and the register F is set to 0, thereafter A (the control signal 2) is compared with I (the intermediate signal 21);

2.1.1 if A is greater than I, R is incremented, and A and I are compared again, and depending on the result of this comparison, one of steps 2.1.1, 2.1.2, or 2.1.3 is performed;

2.1.2 if A is less than I, then R is decremented and A and I are compared again, and depending on the result of the comparison, one of steps 2.1.1, 2.1.2, and 2.1.3 is performed;

2.1.3 if A and I are equal, then the value of F is tested;

2.1.3.1 if F=0, then R is decremented;

2.1.3.2 if F=1, then R is incremented;

2.2 if R is not equal to Rm, then R is decremented; and 3. if M equals V, then neither R nor C is changed.

The digital servo-control system of the invention thus makes it possible to obtain resolution which is better than that of the converter 9, providing that k is greater than unity.

Without going beyond the scope of the invention, it is naturally possible to increase the number of adjustment assemblies, where an adjustment assembly is constituted by a converter analogous to the second converter 11 and a voltage divider analogous to the divider 13. In such a case, each adjustment assembly has its own division factor k. The control signal 2 or the intermediate signal 21 is then the sum of the correction signal 10 and the signals delivered by the various adjustment assemblies. The processor 5 then includes means similar to those described above for generating digital values for application to the various converters.

The servo-control system of the invention is advantageously applied to controlling a very high stability oscillator. The frequency excursion compared with the central operating frequency of such an oscillator often lies between $10^{-7}$ and $10^{-6}$ for a control voltage varying between 0 volts and 10 volts.

The system of the invention may be configured, for example, as follows:

converters 9 and 11: 12 bits with a reference voltage of 10 V;

voltage divider 13 having a division factor k equal to 100; and comparator 22 having a threshold of 20 $\mu$V.

The minimum variation of the adjustment signal 14 is thus 24.4 $\mu$V which corresponds to a minimum variation of the control signal of 57 $\mu$V given the threshold of the comparator 22 and the step size error of the second converter 11. The performance of the system in resolution terms is thus equivalent to that which could be obtained using an 18-bit digital-to-analog converter.

The following characteristic values may be used in such an application:

Rm=0
R1=200
R2=300
RM=500.

I claim:

1. A digital servo-control system, for equipment having an input for receiving a control signal and producing a measurement signal representative of a parameter to be servo-controlled, the system comprising a processor receiving both said measurement signal and a reference value and delivering both a correction value to a first digital to analog converter and an adjustment value to an adjustment assembly, a summing circuit producing said control signal on the basis of a correction signal delivered by said first converter and an adjustment signal delivered by said adjustment assembly, wherein said adjustment assembly includes a second digital-to-analog converter which receives said adjustment value, followed by a voltage divider which produces said adjustment signal, said adjustment value providing a contribution to said control signal which is conditioned by the division factor of said voltage divider.

2. The digital servo-control system according to claim 1, including a timing module having an input that receives an intermediate signal delivered by said summing circuit and having an output on which said control signal is delivered, a comparator having first and second inputs and which receives said intermediate signal on said first input and said control signal on said second input and which delivers an output signal specifying the position of said control signal relative to said intermediate signal, said output signal being delivered to said processor, said processor including means suitable, when said correction value has been changed, for acting on said adjustment value in such a manner as to cause said intermediate signal and said control signal to tend to be equal.

3. The application of the digital servo-control system according to claim 1 to servo-controlling a voltage controlled oscillator.

* * * * *